Jan. 3, 1956 G. FRANKE ET AL 2,729,036
MACHINE TOOLS
Filed April 8, 1952 6 Sheets-Sheet 1

INVENTORS:
GEORG FRANKE AND
OTTO MALFELD
BY

Jan. 3, 1956  G. FRANKE ET AL  2,729,036
MACHINE TOOLS

Filed April 8, 1952  6 Sheets-Sheet 3

INVENTORS:
GEORG FRANKE AND
OTTO MALFELD
BY

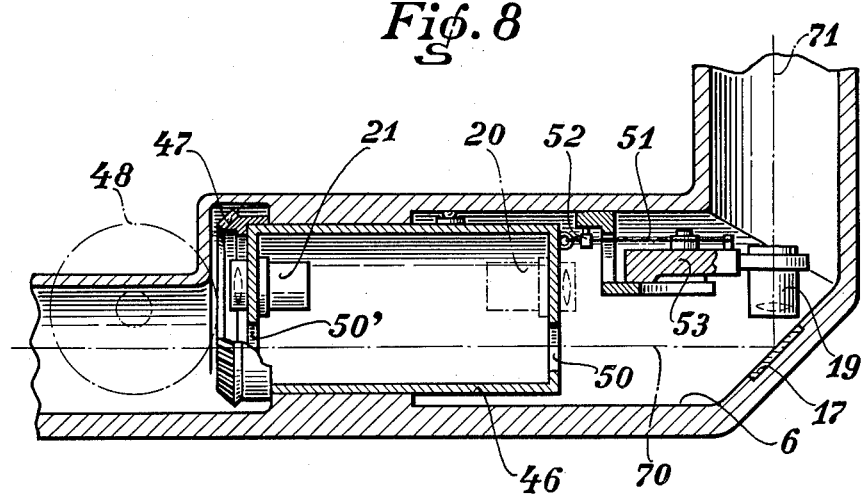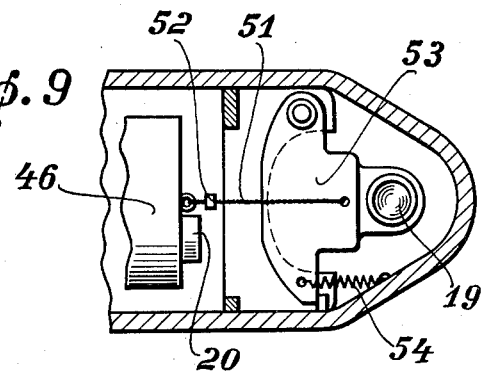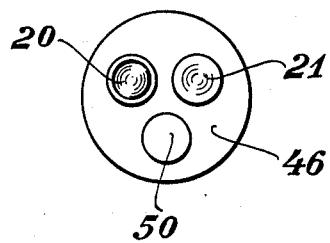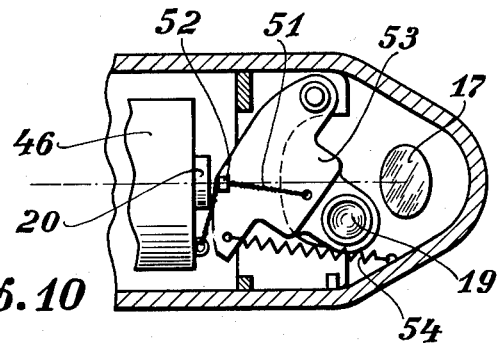

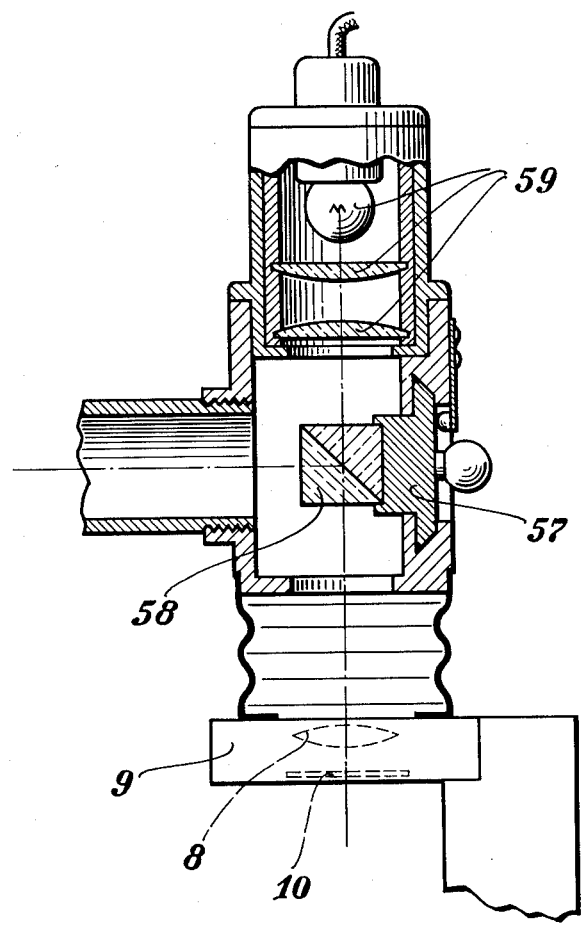

INVENTORS:
GEORG FRANKE & OTTO MALFELD

United States Patent Office 2,729,036
Patented Jan. 3, 1956

2,729,036
MACHINE TOOLS

Georg Franke and Otto Malfeld, Wetzlar, Germany, assignors to Hommel-Werke G. m. b. H., and Ernst Leitz G. m. b. H., Mannheim-Kaefertal and Wetzlar, Germany Application April 8, 1952, Serial No. 281,238

Claims priority, application Germany April 12, 1951

17 Claims. (Cl. 51—165)

The present invention relates to a machine tool and especially to grinding machines for grinding a profiled work piece and more particularly, to a machine of the kind described having optical magnifying means projecting the working edge of the disc of the machine on a member, thus allowing an exact supervision of the shaping operation.

It is an object of the present invention to render sharp the image of the edge of the tool independently of the motion thereof.

It is another object of the present invention to enable an easy observation of the optical image projected on the member.

It is a further object of the present invention to provide an optical system making an image which can be supervised by an operator without tiring his eyes.

A machine tool according to the present invention comprises in its broadest aspect in combination a frame, a tool, means for reciprocating the tool with respect to the frame, a screen, an optical system for reproducing an image of the tool on the screen, a first objective forming part of the optical system and being rigidly connected to the tool reciprocating means so as to participate in the reciprocations of the tool, and a second objective forming part of the optical system, the second objective being focused to infinity.

Preferably the first objective is a collimator and the second objective is formed as a pancratic system.

In one embodiment of the present invention a plurality of lens systems exchangeable against one another are inserted, one at a time, in the path of the light beam coming from the second objective so as to magnify the image formed by the second objective. Preferably the range of magnification of the pancratic system is larger than the magnification of each of the lens systems.

In one embodiment of the present invention the optical system deflects the beam of light between the tool and the screen by substantially 90° at a plurality of places so as to form a first light path and a second light path including an angle of substantially 90° with said first light path, and a revolvable drum has three sectors including each an angle of substantially 120° which are arranged, one at a time, in the first light path, two of the three sectors accommodating two of the lens systems, respectively, the third of the three sectors having an aperture free from any of the lens systems, a shiftable member being arranged in the second light path and accommodating the third lens system, means being provided for coupling the revolvable drum and the member so as to shift the third lens system accommodated in the member into the second light path whenever the third sector of the revolving drum having the aperture is in the first light path.

Preferably the third lens system has a smaller focal length than the two lens systems accommodated in the drum.

In one embodiment of the present invention the pancratic system has a first part and a second part, the first part being guided by a first element having a cam surface which cooperates with a helically-shaped element for guiding the second part of the pancratic system.

Another embodiment of the present invention comprises in combination a grinding disc having a circular edge and an axle arranged perpendicularly to the plane of the grinding disc; means for rotating the axle of the grinding disc, means for imparting to the grinding disc a reversing motion in a direction perpendicular to the axle of the grinding disc, means for clamping a work piece to be ground opposite to the edge of the grinding disc so as to be engaged by the same in a predetermined position of the reversing motion of the grinding disc, a member carrying a tracing of the profile to be ground by the grinding disc, optical magnifying means for projecting on the member the edge of the grinding disc engaging the work piece, and means for coupling the optical means with the motion imparting means so as to obtain a sharp image on the member of the edge of the grinding disc.

In one embodiment of the present invention the optical means consist of an optical magnifying system including an objective which is rigidly connected to a slide supporting the axle of the grinding disc.

Preferably, the optical system includes a light source arranged below the work piece and the edge of the grinding disc engaging the work piece, a preferably stationary hollow tube having one end arranged above the edge of the grinding disc engaging the work piece and another end arranged above the member, light-reflecting members being arranged in the hollow tube and deflecting the light entering by the one end of the hollow tube to the other end of the hollow tube, the objective being slidably arranged with respect to the one end of the hollow tube.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 8 is a sectional side elevation on an enlarged scale of another part of the device shown in Fig. 1;

Figs. 9 and 10 are plan views of part of the device shown in Fig. 8 in two positions thereof, respectively;

Fig. 11 is an end elevation of a part of the device shown in Figs. 8 to 10;

Fig. 12 is a side elevation partly in section of a modified embodiment of the illuminating device shown in Fig. 1;

Figure 1:
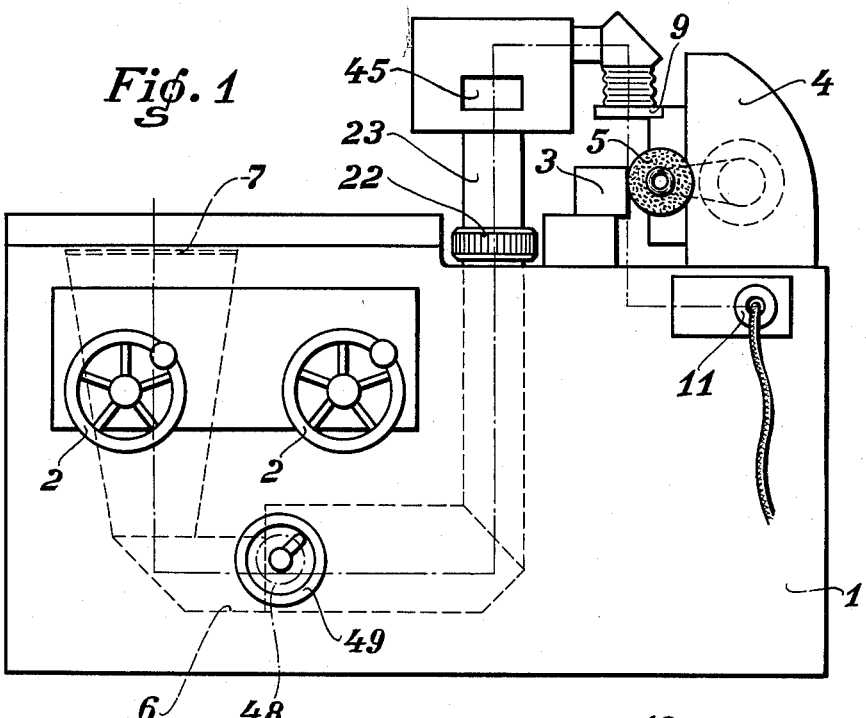
Fig. 1 is a side elevation of a machine tool according to a first embodiment of the prsent invention.
Figure 2:
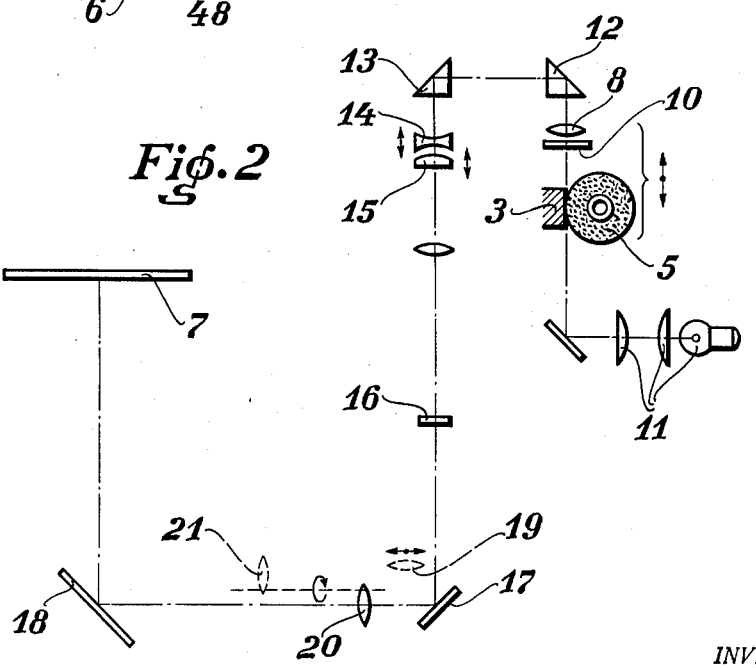
Fig. 2 is a diagram showing the path of the light rays in the embodiment shown in Fig. 1.

Referring now to the drawings and first to Fig. 1, the machine tool has a bed or frame 1 on the outside of which are arranged hand wheels 2 for moving the work piece 3 and/or the tool shown here as a grinding disc 5 which is vertically reciprocable on the bracket 4. The spot of engagement between the grinding disc 5 and the work piece 3 is illuminated from below by means of an illuminating device 11 the several parts of which can be seen from Fig. 2. The light beam is deflected by 90° at a plurality of places and traverses a hollow tube 6 including a first light path 70 and a second light path 71 more fully shown in Fig. 8 and which include an angle of substantially 90° with each other. The hollow tube 6 ends at the upper level of the bed 1 in a projecting screen 7 on which is arranged a magnified tracing of the profile to be shaped by the grinding wheel 5 in the work piece 3. The optical system projecting the tool 5 on the screen 7 includes a first objective 8 (see Fig. 2) preferably a collimator objective, which is arranged in a mounting 9 having a protective glass shield 10 (Fig. 2). The mounting 9 is attached to the movable part of the bracket 4 guiding the tool or grinding disc 5 so that the first objective 8 is movable together with the tool 5. In consequence thereof the circular edge of the tool 5 engaging the work piece 3 is permanently at the front focus of the first objective 8. Instead of that part of the edge of the grinding wheel 5 which engages the work piece the part of the edge opposite to the engaging part could be at the front focus of the objective.

Behind the first objective 8 the light forms a beam of parallel rays which is twice deflected by reflecting prisms 12 and 13 (Fig. 2) by 90° to a second objective 14, 15 being focused to infinity. The second objective 14, 15 is designated as a pancratic system consising of a biconcave lens 14 and a plano-convex lens 15 and produces an image of the grinding disc 5 at the intermediate plane 16. The rays are further deflected by mirrors 17 and 18 and finally reach the screen 7. Three exchangeable lens systems 19, 20 and 21 are inserted, one at a time, in the path of the light rays coming from the second objective formed by the pancratic system 14, 15 so as to magnify the image formed by the same.

Figure 3:
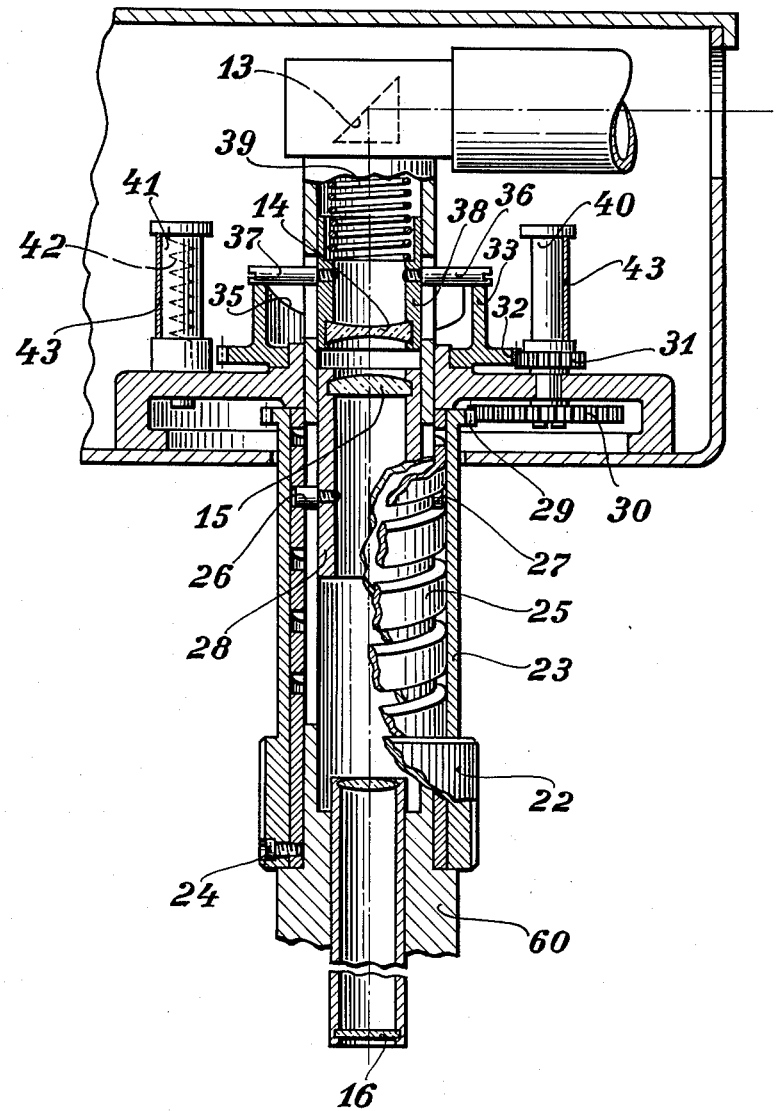
Fig. 3 is a sectional view on an enlarged scale of a part of the device shown in Fig. 1.
Figure 4:
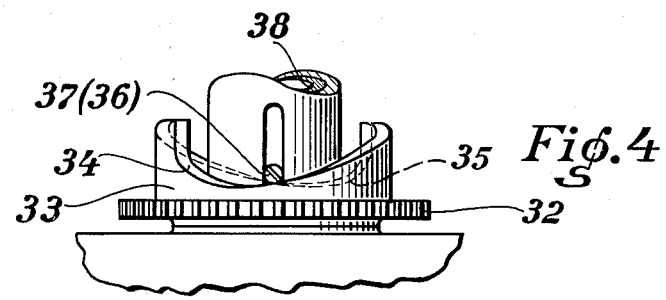
Fig. 4 is a side elevation of a part of the device shown in Fig. 3.

Referring now to Figs. 3 and 4 showing the pancratic system and the parts associated therewith for adjusting the same in greater detail, an accessible part 60 surrounding part of the light tube 6 is provided with a knurled knob 22 connected to a sleeve 23 connected by a screw pin 24 with a member 25 forming a double helix which guides by means of the pins 26, 27 a sleeve 28 in which the plano-convex lens 15 of the pancratic objective 14, 15 is arranged. It should be noted that by turning the knurled knob 22 the lens 15 can be adjusted. The sleeve 23 is provided at its upper end with a gear rim 29 meshing with a toothed wheel 30 rigidly connected to another toothed wheel 31 meshing with a gear rim 32 rigidly connected to a sleeve 33 the upper edge of which is formed as a double cam surface 34, 35 on which two pins 36 and 37 slide which are guiding a sleeve 38 holding the biconcave lens 14 of the pancratic system 14, 15. A helical spring 39 presses the pins 36, 37 connected to the sleeve 38 against the cam surface 34, 35 of sleeve 33. Thus it will be understood that by a rotation of the knurled knob 22 not only the lens 15 but also the lens 14 is adjusted so that the magnification of the pancratic system 14, 15 can be adjusted, say between the values 4 and 10, by rotating the knurled knob 22.

Figure 5:
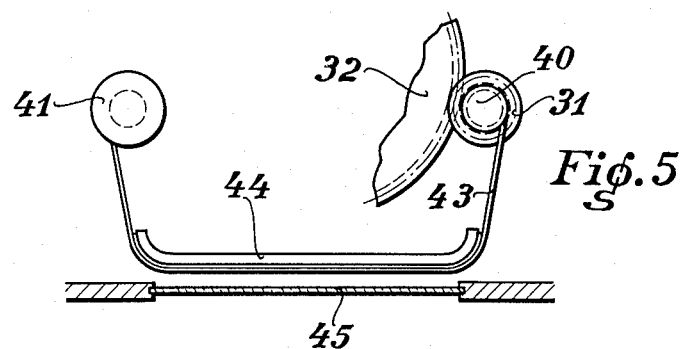
Fig. 5 is a plan view of part of Fig. 3.

With the toothed wheels 30, 31 is rigidly connected a drum 40 arranged on one side of the sleeve 33, on the other side of which is arranged a drum 41 containing a spring 42. A band 43 (see also Fig. 5) is guided by the drums 40 and 41 and passes along a substantially straight guiding member 44 behind a window 45. The band 43 serves for indicating the magnification to which the pancratic system 14, 15 has been adjusted as will be more fully explained hereinafter with reference to Figs. 6 and 7.

Figs. 8 to 11 show on a larger scale the magnifying lens systems 19, 20 and 21 and the parts associated therewith. In the lowermost horizontal part of the hollow tube 6 containing the first light path 70 a drum 46 is revolvably arranged and can be rotated by means of a hand wheel 49 shown in Fig. 1 being on the same shaft with a bevel gear 48 shown in Fig. 8 and meshing with a bevel gear 47 rigidly connected to the drum 46. The drum includes three sectors each including an angle of 120°. Two of these sectors are provided with the magnifying lens systems 20 and 21 whereas the third sector is provided with apertures 50, 50' which are free from any lenses. The third lens system 19, which has preferably the shortest focal length among the lens systems 19, 20, 21, is arranged in a pivoted arm 53 so that it can be shifted into the light path 71 extending through the vertical part of the tube 6. The arm 53 is acted upon by a spring 54 and is urged by the same into the position shown in Fig. 9 in which the lens system 19 is the light path 71. A cord 51 is attached to the revolvable drum 46 and the arm 53 and passes through an eyelet 52 rigidly connected to the wall of the tube 6. In consequence thereof if the drum 46 is rotated from the position shown in Fig. 9 in which none of the lens systems 20 and 21 is in the light path 70 into the position shown in Fig. 10 in which the lens system 20 is in the light path 70, the arm 53 is rotated about the pivot thereof by the cord 51 against the force of the spring 54 so that the lens system 19 is brought out of the light path 71. Conversely, the arm 53 is shifted into the position shown in Fig. 10 when the drum is rotated so that the lens system 21 is in the light path 70 It will be understood that by this arrangement only one of the lens systems 19, 20 and 21 can be in the light path, the other two lens systems being in ineffective position.

Preferably the lens systems have different magnifications; for instance, the lens system 19 has the magnification 5, the lens system 20 the magnification 2.5 and the lens system 21 the magnification 1.25. In consequence thereof a total magnification varying continuously between 5 and 50 can be obtained by the pancratic system 14, 15, the magnification of which is continuously adjustable between 4 and 10, and one of the lens systems 19, 20, 21.

Figure 6:
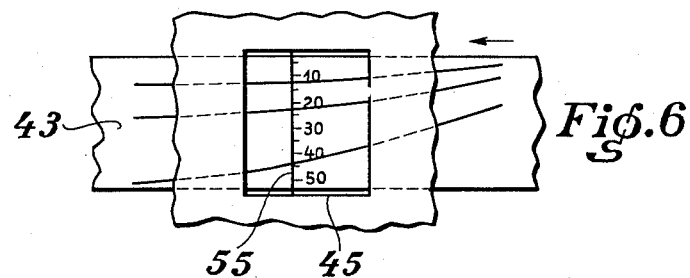
Figs. 6 and 7 are plan views of two embodiments of an element shown in end elevation in Fig. 5.

In accordance with this the indicating band 43 shown in Fig. 6 carries three curves each of which corresponds to one of the lens systems 19, 20, 21. The window 45 has a graduated scale 55 on which the total magnification obtained by the pancratic system 14, 15 and one of the lens systems 19, 20, 21 can be read.

Figure 7:
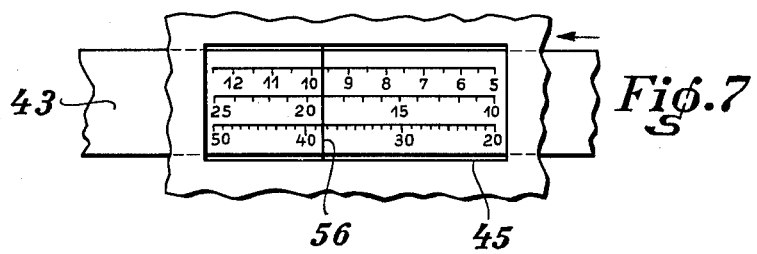

In the modified embodiment according to Fig. 7 the curves are provided with graduations and cooperate with a marking line 56 provided on the window 45.

Referring now to Fig. 12 a modified device for illuminating the grinding disc is shown which affords a top illumination of the grinding disc or wheel. The prism 12 shown in Fig. 2 has to be exchanged against a semitransparent mirror tube 58 by means of the slide 57. A light source with lenses denoted by 59 is arranged on top of the mirror tube 58.

The projecting system can be so designed that the first objective 8 produces an image not of the working part of the edge of the tool, for instance the grinding disc, but of the opposite part so that the magnified image of the latter can be guided along the tracing on the screen 7. Thus by shifting the objective alternately the images of grinding disc and the work piece can be brought to coincidence with the tracing.

It should be understood that instead of the grinding disc any other tool for instance a cutting tool could be provided.

Figure 13:
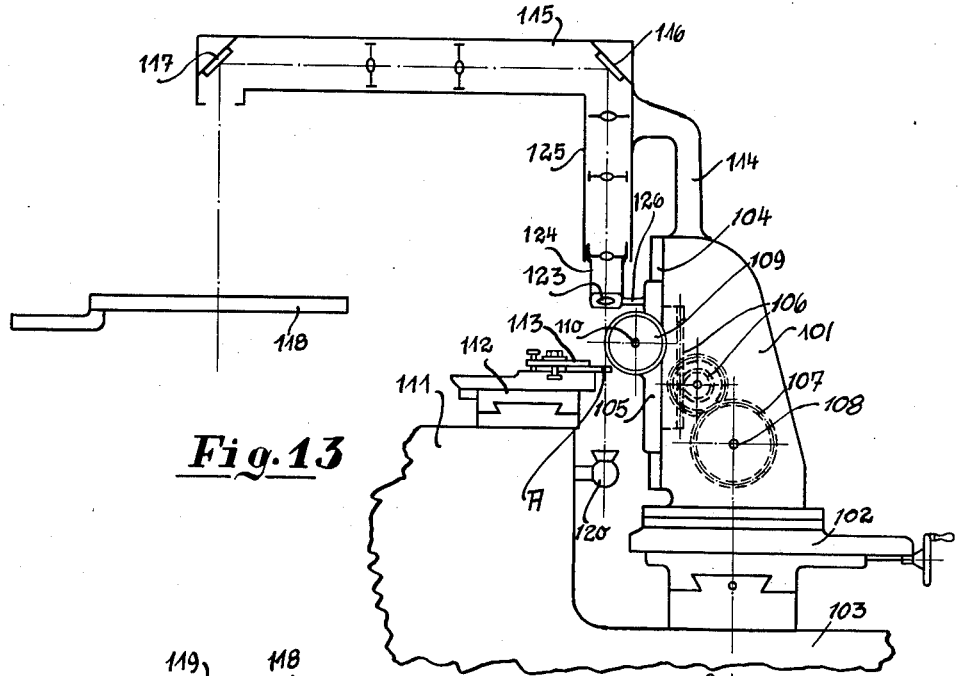
Fig. 13 is a side elevation of a grinding machine according to another embodiment of the present invention.
Figure 14:
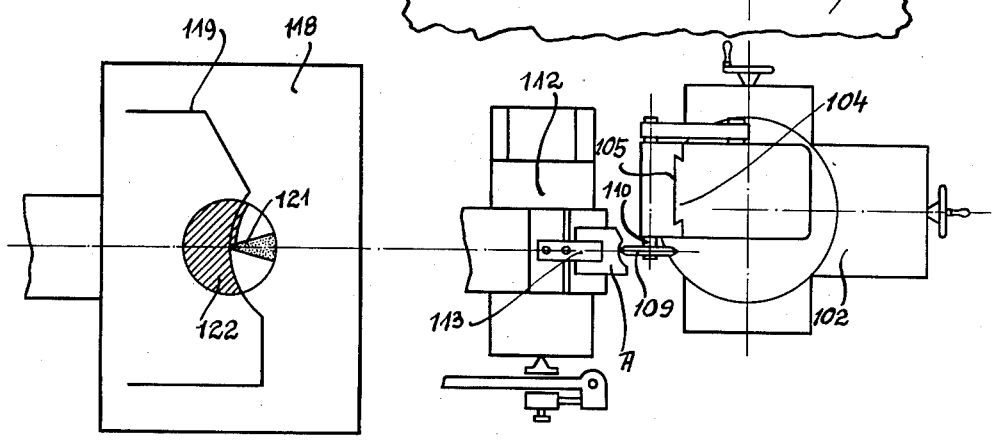
Fig. 14 is a plan view of the machine shown in Fig. 13, the optical system being omitted.

Referring now to Figs. 13 and 14, the grinding machine comprises a bench 103 carrying by means of a cross-slide 102 a support 101, having a guide 104 along which a slide 105 is displaceable in vertical direction. The slide 105 is driven by a shaft 108 over intermediate gearings and a toothed rack 106 and 107. The direction of the rotation of the shaft 108 is alternately reversed by means of a reversing gear (not shown) so that the slide 105 carries out a motion to and fro along the guide 104.

The slide 105 carries a grinding wheel or disc 109 arranged on a driving axle 110. The bench 103 carries a table 111 provided with a cross-slide 112 carrying the work piece A to be ground which is held in position by means of a clamping jaw 113.

In order to grind the profile of the work piece A the grinding disc 109 is carried along the edge of the work piece A, by means of a control mechanism operating the cross-slide 102, the circular edge of the grinding disc 109 being moved along the edge of the work piece by the combined motion caused by the rotation of the grinding disc 109 about the axle 110 and the to and fro motion of the slide 105 in vertical direction.

In order to supervise the advancement of the grinding operation the support 101 carries by means of a bracket 114 an optical system comprising a hollow tube 115, the axis of which is arranged at one end thereof within the working plane of the grinding disc 109 and touches the grinding disc 109 tangentially. The optical axis is bent from the vertical direction to a horizontal direction by means of a first light reflecting member such as a mirror 116 and is bent again into the vertical direction by a second light reflecting member such as a mirror 117, the light-reflecting members 116 and 117 being arranged within the tube 115. Opposite the exit of the optical system a member such as a plate 118 is arranged substantially alongside the grinding disc 109 and the work piece A and is coupled to the cross-slide 102, taking into regard the magnification of the optical system, so that the plate 118 follows the movements of the support 101.

The plate 118 carries a pattern including a tracing 119 of the finished edge of the work piece A. The tracing is enlarged according to the magnification of the optical system. A light source 120 is arranged below the grinding disc 109 coaxially to the axis of the sleeve 125 forming part of the tube 115. In consequence thereof an image 121 is projected on the plate 118 of the working edge of the grinding disc 109 together with an image 122 of the edge of the work piece A engaged by the grinding disc 109 so that the operator can adjust the position of the cross-slide 112 in correspondence to the projection appearing on the plate 118.

The operation of the device described in detail hereinbefore shall now be explained with reference to the embodiment shown in Figs. 13 and 14. However, it should be understood that the embodiment shown in Figs. 1–11 operates substantially in the same manner after the pancratic system 14, 15 and the lens systems 19, 20, 21 are adjusted.

Owing to the to and fro movement of the slide 105 the distance of the working edge of the grinding disc 109 from the entrance of the hollow tube 115 changes continually. In order to take this change of distance into account the part 124 of the optical system carrying the objective 123 is slidably arranged within the sleeve 125 carried by the bracket 114 and is coupled or rigidly connected by a link 126 with the slide 105. Thus, the objective 123 maintains the distance from the working edge of the grinding disc 118 which is only adjusted once at the beginning of the operation so that the working edge of the grinding disc 109 is sharply projected on the plate 118 independently of the movement of the slide 105 and the grinding disc 109. The optical system within the sleeve 125 and the tube 115 is so designed that the optical rays are parallel to one another, several lens systems diagrammatically indicated in Fig. 13 being arranged within the sleeve 125 and the tube 115 for this purpose. Thus, it is seen that the to and fro movement of the objective 123 do not change the path of the rays within the sleeve 125 and the hollow tube 115.

A special embodiment of the optical system has been described hereinabove with reference to Figs. 1–11 and the operation and adjustment thereof has been explained.

It will be understood that each of the elements described above, or two or more together, may also find a useful application in other types of grinding machines differing from the types described above.

While the invention has been illustrated and described as embodied in a grinding machine having optical magnifying means projecting the grinding edge of the disc of the machine on a member, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A machine tool, comprising, in combination, a frame; a tool; means for reciprocating said tool with respect to said frame; a screen; an optical system for reproducing an image of said tool on said screen; a first objective forming part of said optical system and being rigidly connected to said tool reciprocating means so as to participate in the reciprocations of said tool; and a second objective forming part of said optical system, said second objective being focussed to infinity.

2. A machine tool, comprising, in combination, a frame; a tool; means for reciprocating said tool with respect to said frame; a screen; an optical system for reproducing an image of said tool on said screen; a first collimator objective forming part of said optical system and being rigidly connected to said tool reciprocating means so as to participate in the reciprocations of said tool; and a second objective forming part of said optical system, said second objective being focussed to infinity.

3. A machine tool, comprising, in combination, a frame; a tool; means for reciprocating said tool with respect to said frame; a screen; an optical system for reproducing an image of said tool on said screen; a first collimator objective forming part of said optical system and being rigidly connected to said tool reciprocating means so as to participate in the reciprocations of said tool; and a second objective forming part of said optical system and formed as a pancratic system, said second objective being focused to infinity.

4. A machine tool, comprising, in combination, a frame; a tool; means for reciprocating said tool with respect to said frame; a screen; an optical system for reproducing an image of said tool on said screen; a first collimator objective forming part of said optical system and being rigidly connected to said tool reciprocating means so as to participate in the reciprocations of said tool; a second objective forming part of said optical system and formed as a pancratic system, said second objective being focused to infinity; and a plurality of lens systems exchangeable against one another and inserted, one at a time, in the path of the light beam coming from said second objective so as to magnify the image formed by said second objective.

5. A machine tool, comprising, in combination, a frame; a tool; means for reciprocating said tool with respect to said frame; a screen; an optical system for reproducing an image of said tool on said screen; a first collimator objective forming part of said optical system and being rigidly connected to said tool reciprocating means so as to participate in the reciprocations of said tool; a second objective forming part of said optical system and formed as a pancratic system, said second objective being focussed to infinity; and a plurality of lens systems exchangeable against one another and inserted, one at a time, in the path of the light beam coming from said second objective so as to magnify the image formed by said second objective, the range of magnification of said pancratic system being larger than the magnification of each of said lens systems.

6. A machine tool, comprising, in combination, a frame; a tool; means for reciprocating said tool with respect to said frame; a screen; an optical system for reproducing an image of said tool on said screen, said optical system deflecting the beam of light between said tool and said screen by substantially 90° at a plurality of places so as to form a first light path and a second light path including an angle of substantially 90° with said first light path; a first collimator objective forming part of said optical system and being rigidly connected to said tool reciprocating means so as to participate in the reciprocations of said tool; a second objective forming part of said optical system and formed as a pancratic system, said second objective being focused to infinity; three lens systems exchangeable against one another and inserted, one at a time, in the path of the light beam coming from said second objective so as to magnify the image formed by said second objective, the range of magnification of said pancratic system being larger than the magnification of each of said lens systems; a revolvable drum having three sectors including each an angle of substantially 120° and being arranged, one at a time, in said first light path, two of said three sectors accommodating two of said lens systems, respectively, the third of said three sectors having an aperture free from any of said lens systems; a shiftable member arranged in said second light path and accommodating said third lens system: and means for coupling said revolvable drum and said member so as to shift said third lens system accommodated in said member into said second light path whenever said third sector of said revolvable drum having an aperture is in said first light path.

7. A machine tool, comprising, in combination, a frame; a tool; means for reciprocating said tool with respect to said frame; a screen; an optical system for reproducing an image of said tool on said screen, said optical system deflecting the beam of light between said tool and said screen by substantially 90° at a plurality of places so as to form a first light path and a second light path including an angle of substantially 90° with said first light path; a first collimator objective forming part of said optical system and being rigidly connected to said tool reciprocating means so as to participate in the reciprocations of said tool; a second objective forming part of said optical system and formed as a pancratic system, said second objective being focused to infinity; three lens systems exchangeable against one another and inserted, one at a time, in the path of the light beam coming from said second objective so as to magnify the image formed by said second objective, the range of magnification of said pancratic system being larger than the magnification of each of said lens systems; a revolvable drum having three sectors including each an angle of substantially 120° and being arranged, one at a time, in said first light path, two of said three sectors accommodating two of said lens systems, respectively, the third of said three sectors having an aperture free from any of said lens systems, the third lens system having a smaller focal length than said two lens systems accommodated in said drum: a shiftable member arranged in said second light path and accommodating said third lens system; and means for coupling said revolvable drum and said member so as to shift said third lens system accommodated in said member into said second light path whenever said third sector of said revolvable drum having an aperture is in said first light path.

8. A machine tool, comprising, in combination, a frame; a tool; means for reciprocating said tool with respect to said frame; a screen; an optical system for reproducing an image of said tool on said screen, said optical system deflecting the beam of light between said tool and said screen by substantially 90° at a plurality of places so as to form a first light path and a second light path including an angle of substantially 90° with said first light path; a first collimator objective forming part of said optical system and being rigidly connected to said tool reciprocating means so as to participate in the reciprocations of said tool; a second objective forming part of said optical system and formed as a pancratic system, said second objective being focused to infinity; three lens systems exchangeable against one another and inserted, one at a time, in the path of the light beam coming from said second objective so as to magnify the image formed by said second objective, the range of magnification of said pancratic system being larger than the magnification of each of said lens systems; a revolvable drum having three sectors including each an angle of substantially 120° and being arranged, one at a time, in said first light path, two of said three sectors accommodating two of said lens systems, respectively, the third of said three sectors having an aperture free from any of said lens systems, the third lens system having a smaller focal length than said two lens systems accommodated in said drum; a support movably arranged in said second light path and accommodating said first lens system; resilient means urging said support into the position thereof in which said third lens system is in said second light path; and a cord attached to said drum and said support and shifting said support against the action of said resilient means so as to bring said third lens system out of said second light path whenever said drum is revolved so as to place any of said two lens systems in said first light path.

9. A machine tool, comprising, in combination, a frame; a tool; means for reciprocating said tool with respect to said frame; a screen; an optical system for reproducing an image of said tool on said screen; a first collimator objective forming part of said optical system and being rigidly connected to said tool reciprocating means so as to participate in the reciprocations of said tool; a second objective forming part of said optical system and formed as a pancratic system, said second objective being focused to infinity, said pancratic system having a first lens and a second lens; a cam having a cam surface and guiding said first lens of said pancratic system; and a helically-shaped element cooperating with said cam surface of said cam and guiding said second lens of said pancratic system.

10. A machine tool, comprising, in combination, a frame; a tool; means for reciprocating said tool with respect to said frame; a screen; an optical system for reproducing an image of said tool on said screen; a first collimator objective forming part of said optical system and being rigidly connected to said tool reciprocating means so as to participate in the reciprocations of said tool; a second objective forming part of said optical system and formed as a pancratic system, said second objective being focused to infinity, said pancratic system having a first lens and a second lens; a cam having a cam surface and guiding said first lens of said pancratic system; a helically-shaped element cooperating with said cam surface of said cam and guiding said second lens of said pancratic system; and means connected to said cam surface for indicating the magnification of said pancratic system.

11. A machine tool, comprising, in combination, a frame; a tool; means for reciprocating said tool with respect to said frame; a top illumination system for illuminating said tool, said illuminating system including a semi-transparent reflecting prism; a screen; an optical system for reproducing an image of said tool on said screen; a first objective forming part of said optical system and being rigidly connected to said tool reciprocating means so as to participate in the reciprocations of said tool; and a second objective forming part of said optical system, said second objective being focused to infinity.

12. A machine tool, comprising, in combination, a tool having a circular edge and an axle arranged perpendicular to the plane of said tool and adapted to be rotated; means for imparting to said tool a reversing motion in a direction perpendicular to said axle of said tool; means for clamping a work piece to be shaped opposite to said edge of said tool so as to be engaged by the same in a predetermined position of the reversing motion of said tool; a member carrying a tracing of the profile to be shaped by said tool; a stationary optical magnifying system for projecting on said member said edge of said tool engaging the work piece; an objective forming part of said optical system, said objective being arranged shiftably along the axis thereof with respect to said optical system; and means for coupling said objective with said motion imparting means for movement with said tool so as to obtain a sharp image on said member of said edge of said tool.

13. A machine tool, comprising, in combination, a tool having a circular edge and an axle arranged perpendicular to the plane of said tool and adapted to be rotated; means for imparting to said tool a reversing motion in a direction perpendicular to said axle of said tool; means for clamping a work piece to be shaped opposite to said edge of said tool so as to be engaged by the same in a predetermined position of the reversing motion of said tool; a member carrying a tracing of the profile to be shaped by said tool, said member being arranged substantially alongside said tool and the work piece; optical magnifying means including a hollow tube, light reflecting members arranged in said hollow tube, and an objective arranged near and above said edge of said tool engaging the work piece, said objective being arranged slidably with respect to said hollow tube, said optical means projecting on said member a magnified image of said edge of said tool engaging the work piece; and means for rigidly connecting said objective with said motion imparting means so as to obtain a sharp image on said member of said edge of said tool.

14. A machine tool, comprising, in combination, a tool having a circular edge and an axle arranged perpendicular to the plane of said tool and adapted to be rotated; means for imparting to said tool a reversing motion in a direction perpendicular to said axle of said tool; means for clamping a work piece to be shaped opposite to said edge of said tool so as to be engaged by the same in a predetermined position of the reversing motion of said tool; a member carrying a tracing of the profile to be shaped by said tool, said member being arranged substantailly alongside said tool and the work piece; optical magnifying means including a light source arranged below the work piece and said edge of said tool engaging the work piece; a hollow tube having one end arranged above said edge of said tool engaging the work piece and another end arranged above said member, light reflecting members arranged in said hollow tube and deflecting the light entering by said one end of said hollow tube to said other end of said hollow tube, and an objective slidably arranged with respect to said one end of said hollow tube, said optical means projecting on said member a magnified image of said edge of said tool engaging the work piece; and means for coupling said objective with said motion imparting means so as to obtain a sharp image on said member of said edge of said tool.

15. A machine tool, comprising, in combination, a supporting frame; work holding means mounted on said frame for holding an article to be machined; tool holding means mounted on said frame for holding a tool to operate on the work held by said work holding means, said tool holding means including a movable tool carrier adapted to move with a tool carried thereby; an objective fixed to said tool carrier for movement therewith and being adapted to have its optical axis aligned with a part of a tool carried by said tool carrier; viewing means for viewing an image passing through said objective; and a stationary optical system carried by said frame and being arranged between said objective and viewing means for conveying to the latter an image passing through said objective.

16. A machine tool, comprising, in combination, a supporting frame; work holding means mounted on said frame for holding an article to be machined; tool holding means mounted on said frame for holding a tool to operate on the work held by said work holding means, said tool holding means including a movable tool carrier adapted to move with a tool carried thereby; an objective fixed to said tool carrier for movement therewith and being adapted to have its optical axis aligned with a part of the work and a part of a tool carried by said tool carrier; viewing means for viewing an image passing through said objective; and a stationary optical system carried by said frame and being arranged between said objective and viewing means for conveying to the latter an image passing through said objective.

17. A machine tool, comprising, in combination, a supporting frame; work holding means mounted on said frame for holding an article to be machined; tool holding means mounted on said frame for holding a tool to operate on the work held by said work holding means, said tool holding means including a movable tool carrier mounted on said tool holding means for reciprocation thereon to reciprocate with a tool carried by said tool carrier; an objective fixed to said tool carrier for movement therewith and being adapted to have its optical axis aligned with a part of the work and a part of a tool carried by said tool carrier; viewing means for viewing an image passing through said objective; and a stationary optical system carried by said frame and being arranged between said objective and viewing means for conveying to the latter an image passing through said objective.

References Cited in the file of this patent

UNITED STATES PATENTS

| 2,130,710 | Alexander | Sept. 20, 1938 |
| 2,203,389 | Kurtz | June 4, 1940 |
| 2,404,770 | Bennett et al. | July 30, 1946 |
| 2,552,238 | Turner et al. | May 8, 1951 |
| 2,614,368 | Polk et al. | Oct. 21, 1952 |

FOREIGN PATENTS

| 478,755 | Great Britain | Jan. 25, 1938 |
| 553,594 | Great Britain | May 27, 1943 |